(12) United States Patent
Mouri et al.

(10) Patent No.: US 10,883,686 B2
(45) Date of Patent: Jan. 5, 2021

(54) VEHICLE HEADLIGHT DEVICE

(71) Applicant: TOYOTA JIDOSHA KABUSHIKI KAISHA, Toyota (JP)

(72) Inventors: Fumihiko Mouri, Owariasahi (JP); Takuya Kitazono, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 16/158,674

(22) Filed: Oct. 12, 2018

(65) Prior Publication Data
US 2019/0120454 A1 Apr. 25, 2019

(30) Foreign Application Priority Data
Oct. 25, 2017 (JP) ................ 2017-205975

(51) Int. Cl.
| | |
|---|---|
| *F21S 41/141* | (2018.01) |
| *F21S 41/16* | (2018.01) |
| *F21S 41/36* | (2018.01) |
| *F21S 41/25* | (2018.01) |
| *F21S 41/675* | (2018.01) |
| *F21Y 115/30* | (2016.01) |
| *F21Y 115/10* | (2016.01) |

(52) U.S. Cl.
CPC ............. *F21S 41/16* (2018.01); *F21S 41/141* (2018.01); *F21S 41/25* (2018.01); *F21S 41/36* (2018.01); *F21S 41/675* (2018.01); *F21Y 2115/10* (2016.08); *F21Y 2115/30* (2016.08)

(58) Field of Classification Search
CPC .......... F21S 41/16; F21S 41/675; F21S 41/25; F21S 41/36; F21S 41/141
See application file for complete search history.

(56) References Cited

U.S. PATENT DOCUMENTS

| | | | |
|---|---|---|---|
| 7,561,180 B2 * | 7/2009 | Koike .................... | B60Q 1/484 340/903 |
| 7,782,184 B2 * | 8/2010 | Wittorf .................... | B60Q 1/50 340/435 |

(Continued)

FOREIGN PATENT DOCUMENTS

| | | |
|---|---|---|
| CN | 104006342 A | 8/2014 |
| CN | 107013858 A | 8/2017 |

(Continued)

*Primary Examiner* — Arman B Fallahkhair
(74) *Attorney, Agent, or Firm* — Oliff PLC

(57) ABSTRACT

A vehicle headlight device includes: a first illuminating unit for reflecting, at a first mirror that rotatingly operates, laser light that has exited from a laser light source and making the laser light into scanning light, and a illuminating the scanning light toward a first illumination region that is in front of a vehicle; second illuminating unit for reflecting, at a second mirror that is an aggregate of plural micro mirrors whose angles can be changed, visible light that has exited from a visible light source and making the visible light into information displaying light, and illuminating the information displaying light toward a second illumination region that is in front of the vehicle; and controlling unit for controlling turning-off and turning-on of the laser light source, rotating operation of the first mirror, and changing of the angles of the micro mirrors at the second mirror.

15 Claims, 14 Drawing Sheets

(56) References Cited

U.S. PATENT DOCUMENTS

| | | | |
|---|---|---|---|
| 8,260,536 B2* | 9/2012 | Stefani | B60Q 1/50 |
| | | | 701/418 |
| 9,481,287 B2* | 11/2016 | Marti | B60Q 1/00 |
| 9,987,979 B2* | 6/2018 | Kawamata | G08G 1/005 |
| 10,023,102 B2* | 7/2018 | Mouri | F21S 41/39 |
| 10,041,644 B2* | 8/2018 | Honda | F21S 41/295 |
| 10,043,395 B2* | 8/2018 | Morel | B60Q 1/50 |
| 10,179,534 B2* | 1/2019 | Hoshino | B60Q 1/085 |
| 10,344,932 B2* | 7/2019 | Reisinger | B60Q 1/06 |
| 10,386,043 B1* | 8/2019 | Lim | B60Q 1/50 |
| 2013/0258689 A1* | 10/2013 | Takahira | F21V 14/00 |
| | | | 362/465 |
| 2017/0136939 A1 | 5/2017 | Mouri et al. | |
| 2018/0297511 A1* | 10/2018 | Park | B60Q 1/1423 |

FOREIGN PATENT DOCUMENTS

| | | |
|---|---|---|
| DE | 10 2014 001201 A1 | 7/2015 |
| EP | 2 772 682 A2 | 9/2014 |
| EP | 3 168 526 A1 | 5/2017 |
| EP | 3 181 996 A1 | 6/2017 |
| JP | 2013-232390 A | 11/2013 |
| JP | 2017111977 A | 6/2017 |

* cited by examiner

VEHICLE HEADLIGHT DEVICE

CROSS-REFERENCE TO RELATED APPLICATION

This application is based upon and claims the benefit of priority of the prior Japanese Patent Application No. 2017-205975, filed on Oct. 25, 2017, the entire content of which is incorporated herein by reference.

TECHNICAL FIELD

The present disclosure relates to a vehicle headlight device.

RELATED ART

There has conventionally been proposed a vehicle light including a light source that illuminates light, a condensing lens that condenses the light illuminated from the light source, a DMD (Digital Mirror Device) that, by a collective reflecting surface formed by plural mirror elements that are disposed in the form of a matrix, reflects the light condensed at the condensing lens and forms a pattern, and a projection lens that illuminates the pattern toward the front of a vehicle (refer to Japanese Patent Application Laid-Open (JP-A) No. 2017-111977 (Patent Document 1)).

Further, there has conventionally been proposed a vehicle headlight that has a light-emitting portion that receives laser light that has exited from a laser light source and emits light, and a convex lens that controls the guiding of the laser light from the laser light source to the light-emitting portion, and in which, due to the relative position of the convex lens with respect to the light-emitting portion being changed by an actuator, changes the illuminated position and the spot size of the laser light at the light-emitting portion (refer to JP-A No. 2013-232390 (Patent Document 2)).

However, in a method in which a pattern that is to be illuminated toward the front of a vehicle is formed by reflecting light by a DMD, regions that are not needed for this pattern reflect light in other directions, and therefore, the efficiency of utilizing the light illuminated from the light source decreases. Further, in a method in which laser light is scanned and a drawn pattern is displayed on the road surface (information displaying light is illuminated), the contrast is low at the both end portions of the drawn pattern, and therefore, visibility of the drawn pattern for pedestrians and the like deteriorates.

SUMMARY

An object of the present disclosure is to provide a vehicle headlight device that can suppress a decrease in the efficiency of utilizing light illuminated from a light source, and that can suppress a decrease in the contrast of information displaying light that is illuminated.

A vehicle headlight device relating to a first aspect includes: a first illuminating unit that includes a first mirror that rotatingly operates, the first mirror reflecting laser light that has exited from a laser light source, making the laser light into scanning light, and illuminating the scanning light toward a first illumination region that is in front of a vehicle; a second illuminating unit that includes a second mirror that is an aggregate of a plurality of micro mirrors having angles that can be changed, the second mirror reflecting visible light that has exited from a visible light source, making the visible light into information displaying light, and illuminating the information displaying light toward a second illumination region that is in front of the vehicle; and a controlling unit that controls turning-off and turning-on of the laser light source, rotating operation of the first mirror, and changing of the angles of the micro mirrors at the second mirror.

In accordance with the first aspect, due to the controlling unit controlling the turning-on and turning-off of the laser light source and the rotating operation of the first mirror, the laser light that has exited from the laser light source is made into scanning light, and the scanning light is illuminated toward the first illumination region that is in front of the vehicle. Accordingly, a decrease in the efficiency of utilization of the light that is illuminated from the laser light source is suppressed. Further, due to the controlling unit controlling the changing of the angles of the micro mirrors at the second mirror, the visible light that has exited from the visible light source is made into information displaying light, and the information displaying light is illuminated toward the second illumination region that is in front of the vehicle. Accordingly, a decrease in the contrast of the displayed information is suppressed.

A vehicle headlight device relating to a second aspect is the vehicle headlight device relating to the first aspect, wherein the first mirror is structured by a biaxial scanning mirror that rotates with respective axial directions that are orthogonal to one another.

In accordance with the second aspect, the first mirror is structured by a biaxial scanning mirror. Accordingly, it can be made such that less space is taken-up by the first illuminating unit as compared with a structure in which, for example, the first mirror is structured by a uniaxial scanning mirror that rotates with the vertical direction being the axial direction thereof and a uniaxial scanning mirror that rotates with the horizontal direction being the axial direction thereof.

A vehicle headlight device relating to a third aspect is the vehicle headlight device relating to the first aspect, wherein the first mirror is structured by a first uniaxial scanning mirror that rotates with a first axial direction, and a second uniaxial scanning mirror that rotates with a second axial direction that is orthogonal to the first axial direction.

In accordance with the third aspect, the first mirror is structured by a first uniaxial scanning mirror that rotates with the axial direction thereof being a first direction, and a second uniaxial scanning mirror that rotates with the axial direction thereof being a second direction that is orthogonal to the first direction. Accordingly, the structure of the first illuminating unit is simplified as compared with a case in which the first mirror is structured by a biaxial scanning mirror.

A vehicle headlight device relating to a fourth aspect is the vehicle headlight device relating to any one of the first through third aspects, wherein the controlling unit is structured so as to effect control on the basis of information obtained by a periphery sensing unit for sensing a periphery of the vehicle.

In accordance with the fourth aspect, the controlling unit is structured so as to effect control on the basis of information obtained by a periphery sensing unit that senses the periphery of the vehicle. Namely, the illuminating toward the first illumination region and the illuminating toward the second illumination region are carried out automatically. Accordingly, the burden on the vehicle occupant is reduced as compared with a case in which the illuminating toward the first illumination region and the illuminating toward the second illumination region are carried out manually.

A vehicle headlight device relating to a fifth aspect is the vehicle headlight device relating to any one of the first through fourth aspects, wherein the first illuminating unit and the second illuminating unit have a common projection lens that transmits therethrough the scanning light and illuminates the scanning light toward the first illumination region, and that transmits therethrough the information displaying light and illuminates the information displaying light toward the second illumination region.

In accordance with the fifth aspect, the scanning light and the information displaying light are transmitted through a common projection lens, and are illuminated toward the first illumination region and the second illumination region. Accordingly, the number of parts is reduced as compared with a case in which the scanning light and the information displaying light are respectively transmitted through separate projection lenses and are illuminated toward the first illumination region and the second illumination region.

A vehicle headlight device relating to a sixth aspect is the vehicle headlight device relating to any one of the first through fifth aspects that further includes third illuminating unit that illuminates visible light, which has exited from a visible light source, toward a third illumination region that is further toward the vehicle than the first illumination region, wherein a portion of the third illumination region, which is to be illuminated by the third illuminating unit, is structured so as to be illuminated by the first illuminating unit.

In accordance with the sixth aspect, a portion of the third illumination region, which is to be illuminated by the third illuminating unit, is illuminated by the first illuminating unit. Accordingly, the shape of the third illumination region that is illuminated by the third illuminating unit is simplified.

A vehicle headlight device relating to a seventh aspect is the vehicle headlight device relating to any one of the first through sixth aspects, wherein the second illuminating unit is structured so as to illuminate the information displaying light in which at least a mark appears.

In accordance with the seventh aspect, the second illuminating unit illuminates the information displaying light in which at least a mark appears. Accordingly, a caution alert or the like is efficiently given to a pedestrian or the like.

A vehicle headlight device relating to an eighth aspect is the vehicle headlight device relating to any one of the first through seventh aspects, wherein the second illuminating unit is structured so as to illuminate the information displaying light that has been colored so as to be full-color.

In accordance with the eighth aspect, the second illuminating unit illuminates the information displaying light that has been colored so as to be full-color. Accordingly, a caution alert or the like is given more efficiently to a pedestrian or the like, as compared with a case in which the second illuminating unit illuminates monochromatic information displaying light.

In accordance with the first aspect, a decrease in the efficiency of utilization of light illuminated from a light source can be suppressed, and a decrease in the contrast of information displaying light that is illuminated can be suppressed.

In accordance with the second aspect, it can be made such that the first illuminating unit takes up less space.

In accordance with the third aspect, the structure of the first illuminating unit can be simplified.

In accordance with the fourth aspect, the burden on the vehicle occupant can be reduced.

In accordance with the fifth aspect, the number of parts can be reduced.

In accordance with the sixth aspect, the shape of the third illumination region that is illuminated by the third illuminating unit can be simplified.

In accordance with the seventh aspect, a caution alert or the like can be efficiently given to a pedestrian or the like.

In accordance with the eighth aspect, a caution alert or the like can be more efficiently given to a pedestrian or the like.

DETAILED DESCRIPTION

An embodiment relating to the present disclosure is described in detail hereinafter on the basis of the drawings. Note that, for convenience of explanation, arrow UP that is shown appropriately in the respective drawings indicates the vehicle upward direction, arrow FR indicates the vehicle forward direction, and arrow RH indicates the vehicle rightward direction. Accordingly, in the following description, when vertical, longitudinal, and left and right directions are used without being specified in particular, they refer to the vertical of the vehicle vertical direction, the longitudinal of the vehicle longitudinal direction, and the left and the right of the vehicle left-right direction (the vehicle transverse direction).

Figure 1:
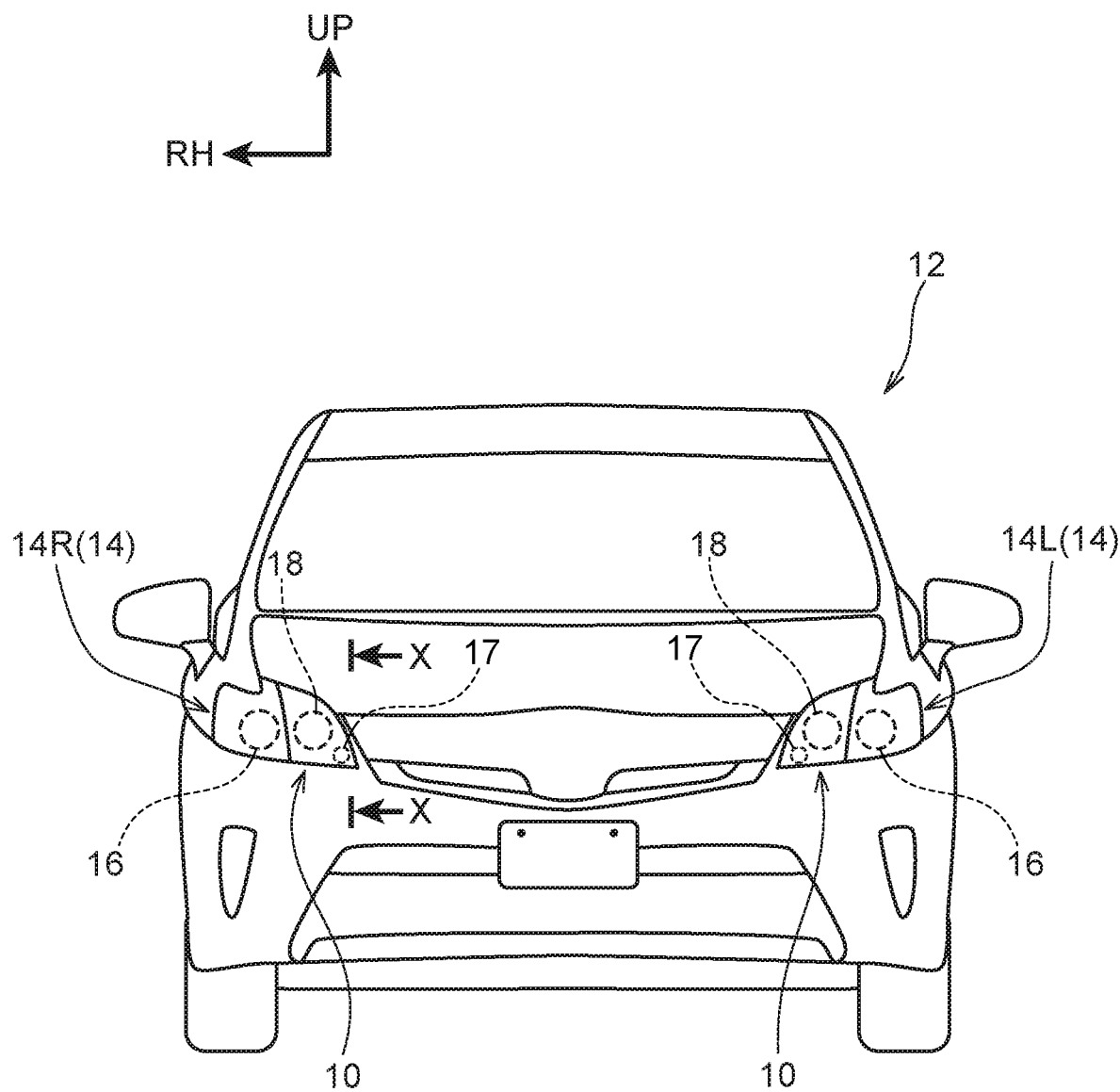
FIG. 1 is a front view showing a vehicle that is equipped with a vehicle headlight device relating to a present embodiment.

As shown in FIG. 1, a pair of left and right headlamp units 14 for ensuring visibility at the front side of a vehicle 12 are provided at the vehicle 12. Namely, a headlamp unit 14R is disposed at the front end portion at the right side of the vehicle 12, and a headlamp unit 14L is provided at the front end portion at the left side of the vehicle 12. The headlamp units 14R, 14L are structured so as to have left-right symmetry in the vehicle transverse direction.

Accordingly, in the present embodiment, the headlamp unit 14R that is at the right side will be described, and description of the headlamp unit 14L that is at the left side is omitted. The headlamp unit 14R at the right side is structured to include a low-beam unit 16 that serves as a third illuminating unit and is disposed at the vehicle transverse direction outer side, a high-beam unit 18 that serves as a first illuminating unit and is disposed at the vehicle transverse direction inner side, and a drawing beam unit 17 that serves as a second illuminating unit and is disposed at the lower side of the high-beam unit 18.

Figure 6:
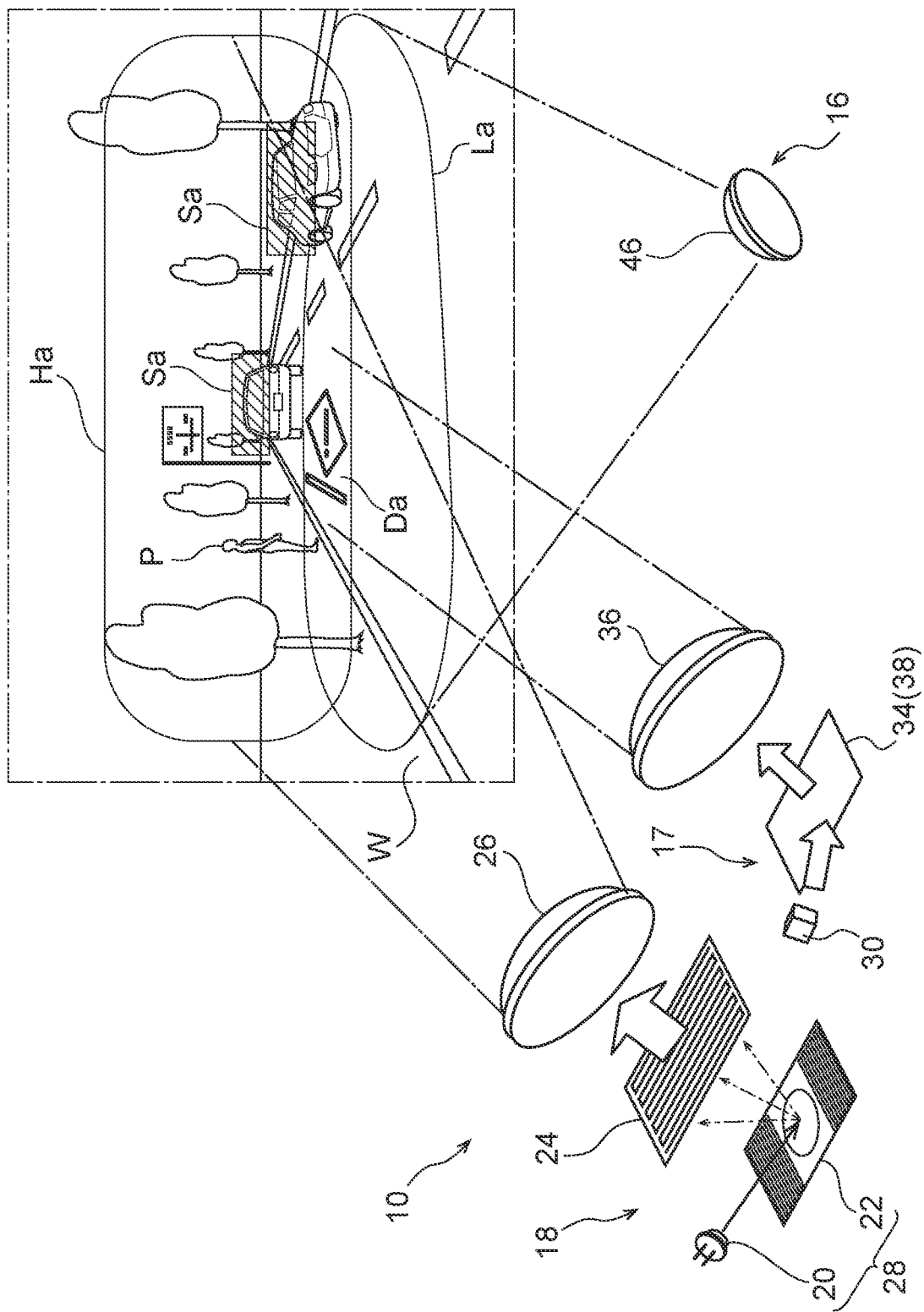
FIG. 6 is an explanatory drawing showing first through third illumination regions that are illuminated by first through third illuminating unit of the vehicle headlight device relating to the present embodiment.

As shown in FIG. 6, the low-beam unit 16 is structured so as to illuminate visible light, which has been transmitted through a projection lens 46, onto a low-beam orientation area La that serves as a third illumination region and is on the roadway (road surface) at the front side of the vehicle 12. Further, the high-beam unit 18 illuminates scanning light, which is visible light that has been transmitted through a projection lens 26, onto a high-beam orientation area Ha that serves as a first illumination region that is at the front side and is further toward the upper side than the low-beam orientation area La that is illuminated by the low-beam unit 16.

Moreover, the drawing beam unit 17 is structured so as to illuminate information displaying light (a drawn pattern), which is visible light that has been transmitted through a projection lens 36, onto a drawing beam orientation area Da that serves as a second illumination region and that is between the front portion of the low-beam orientation area La and the lower portion of the high-beam orientation area Ha and is on the roadway (the road surface) near a sidewalk W. Note that it is preferable that at least a mark such as the illustrated "!" or a line or the like appears as the information displaying light (the drawn pattern). However, the drawn pattern is not limited to this, and, for example, a word such as "stop" or the like may appear, although this is not illustrated.

Figure 2:
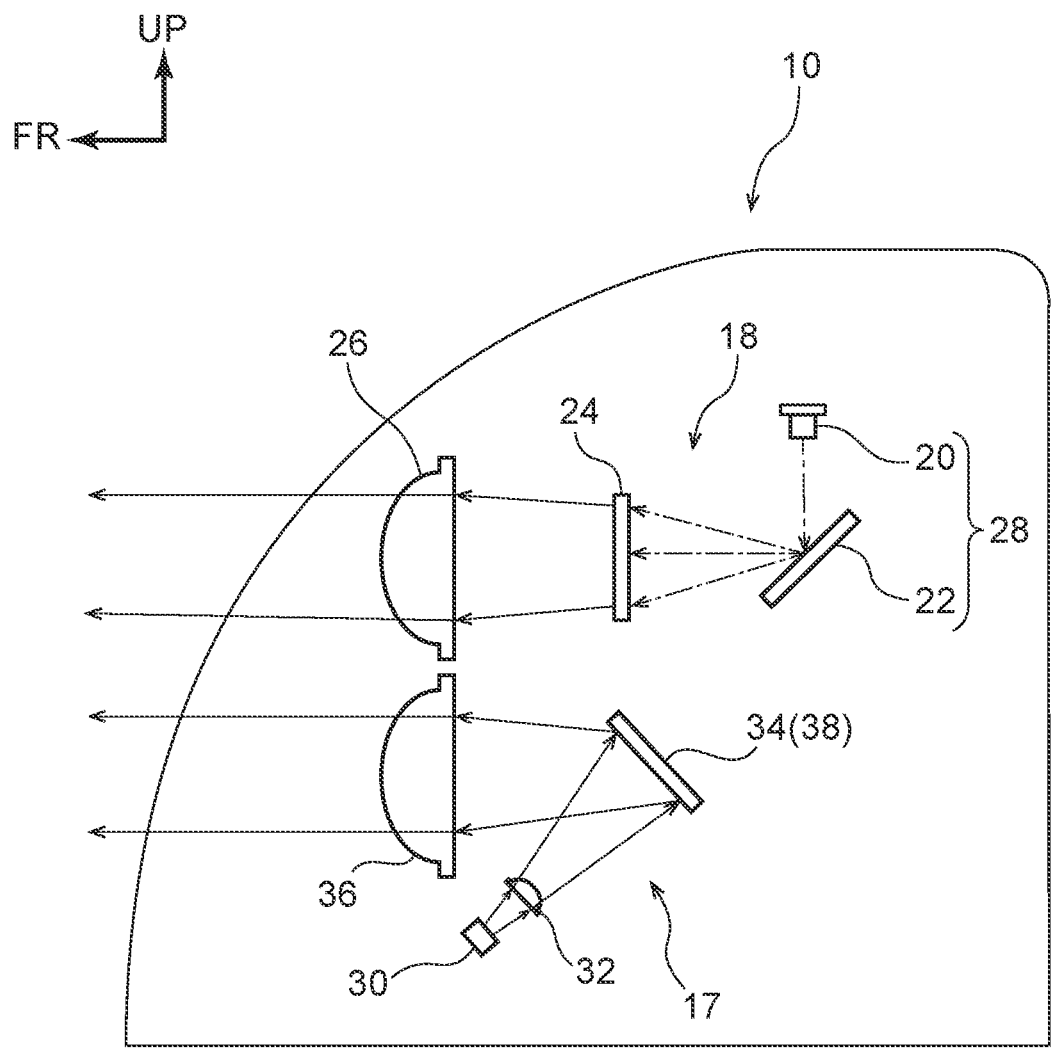
FIG. 2 is a side view seen in the direction of arrow line X-X of FIG. 1, and showing the structure of the vehicle headlight device relating to the present embodiment.
Figure 3:
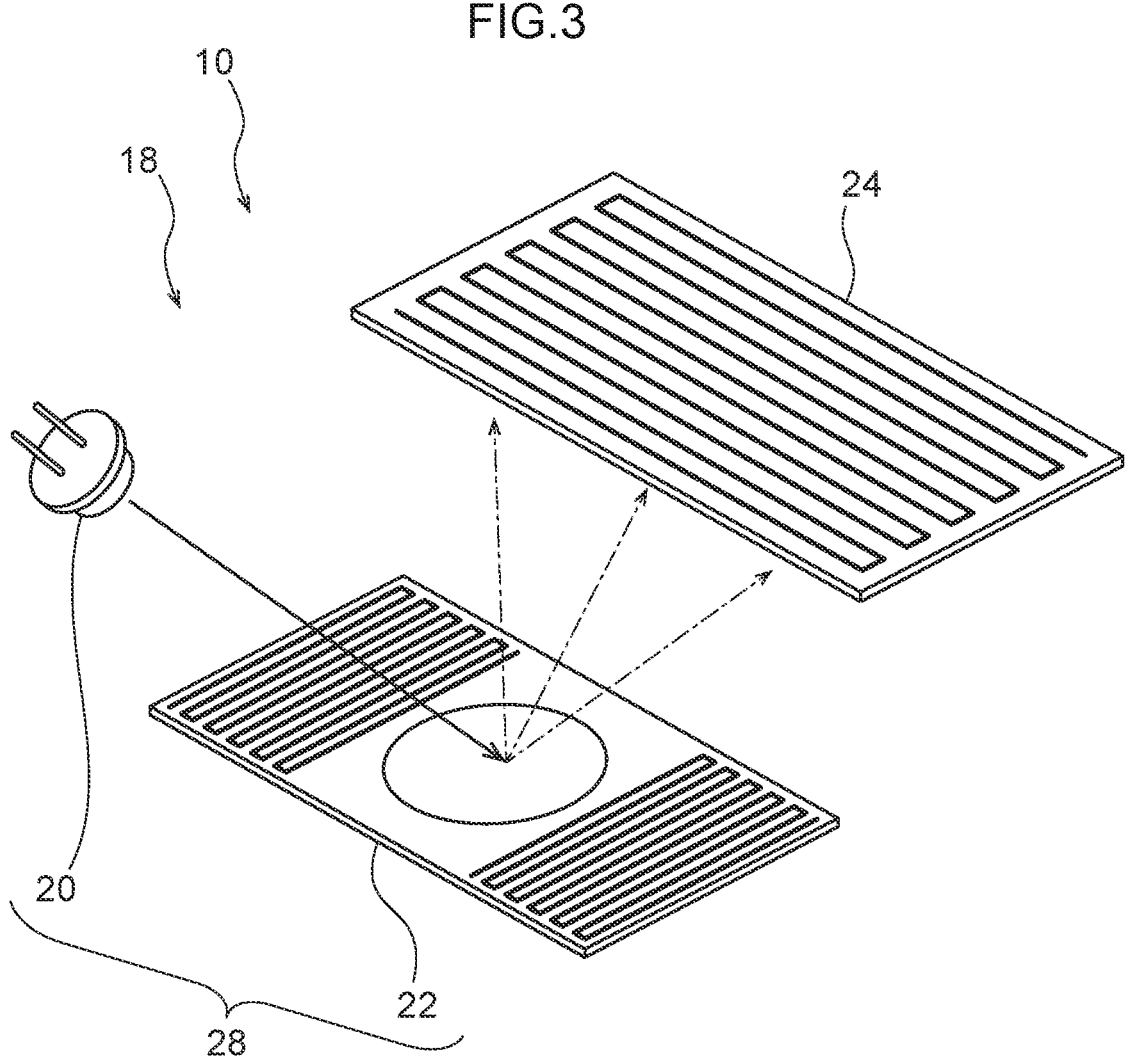
FIG. 3 is an explanatory drawing showing a first illuminating unit of the vehicle headlight device relating to the present embodiment.

As shown in FIG. 2 and FIG. 3, the high-beam unit 18 has a laser light source 20, a biaxial scanning mirror 22 that serves as a first mirror and reflects the laser light that has exited from the laser light source 20, a fluorescent body 24 that transmits the laser light that has been reflected by the biaxial scanning mirror 22, and the projection lens 26 that transmits the laser light that has been transmitted through the fluorescent body 24 and that illuminates the laser light toward the vehicle front side. Note that a laser scanning unit 28 (see FIG. 5) is structured by the laser light source 20 and the biaxial scanning mirror 22.

Figure 5:
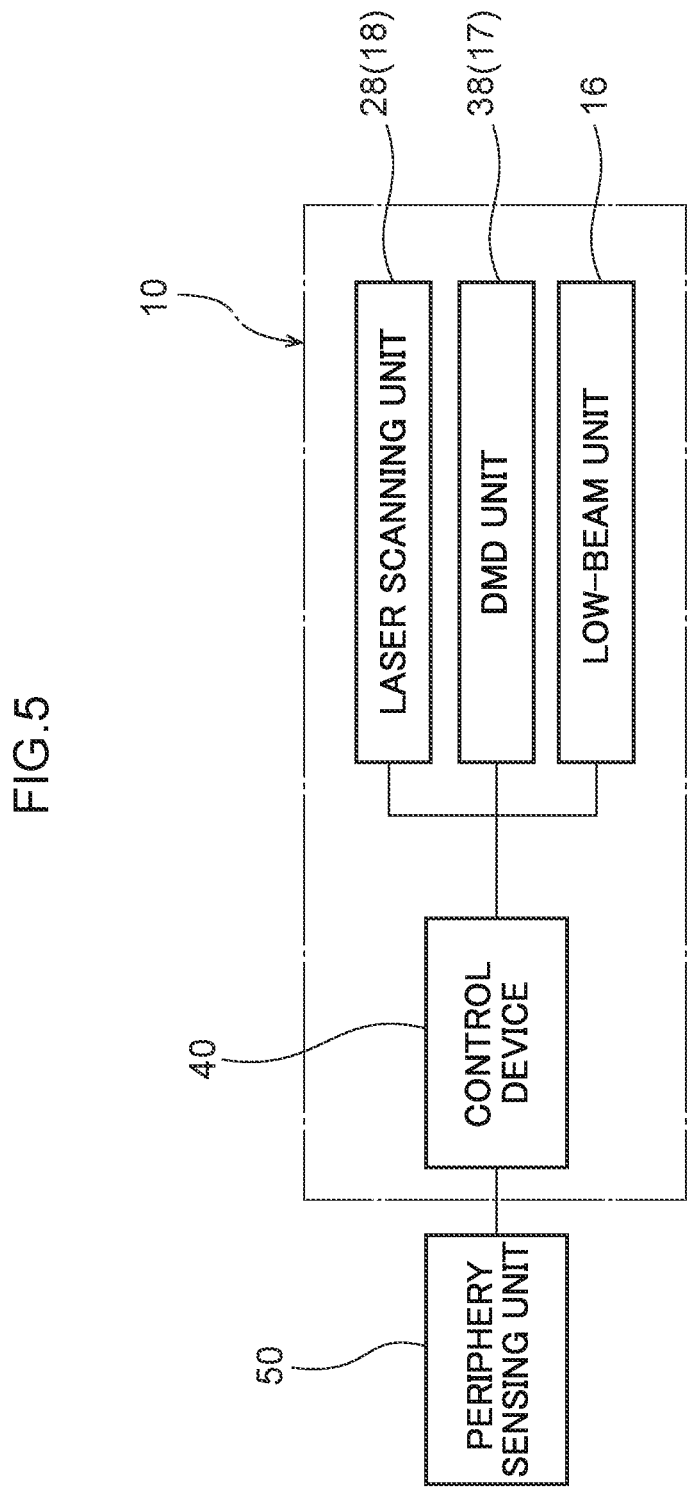
FIG. 5 is a block drawing showing the vehicle headlight device relating to the present embodiment and a periphery sensing unit.

The laser light source 20 is a blue semiconductor laser (LD: Laser Diode), and is a high-luminance light source. The biaxial scanning mirror 22 is structured so as to be able to rotate in the left-right direction (the horizontal direction) with the vertical direction being the axial direction, and is structured so as to be able to rotate in the vertical direction with the horizontal direction being the axial direction. Further, as shown in FIG. 5, the laser scanning unit 28 that is structured by the laser light source 20 and the biaxial scanning mirror 22 is electrically connected to a control device 40 that serves as a controlling unit.

Accordingly, due to the biaxial scanning mirror 22 rotatingly operating at a high speed of, for example, 20,000 revolutions per second (known, so-called raster scanning) by control of the control device 40, the laser light that is illuminated from the projection lens 26 becomes planar scanning light. Further, due to the turning-on and turning-off of the laser light source 20 being controlled by the control device 40, as shown in FIG. 6, a lighting exclusion area Sa is formed at the high-beam orientation area Ha. Note that the lighting exclusion area Sa is an area in which a portion of the light of the high-beam orientation area Ha is blocked, in order to not impart glare to oncoming vehicles or preceding vehicles.

The fluorescent body 24 is a yellow fluorescent body, and converts the wavelength of the incident blue laser light so as to make it white laser light. The projection lens 26 is a lens whose vehicle front side protrudes-out in a hemispherical shape and whose vehicle rear side is a flat surface. The projection lens 26 transmits therethrough the laser light (scanning light), which has been converted from blue into white by the yellow fluorescent body 24, and illuminates the converted laser light toward the high-beam orientation area Ha that is at the vehicle front side.

Figure 4:
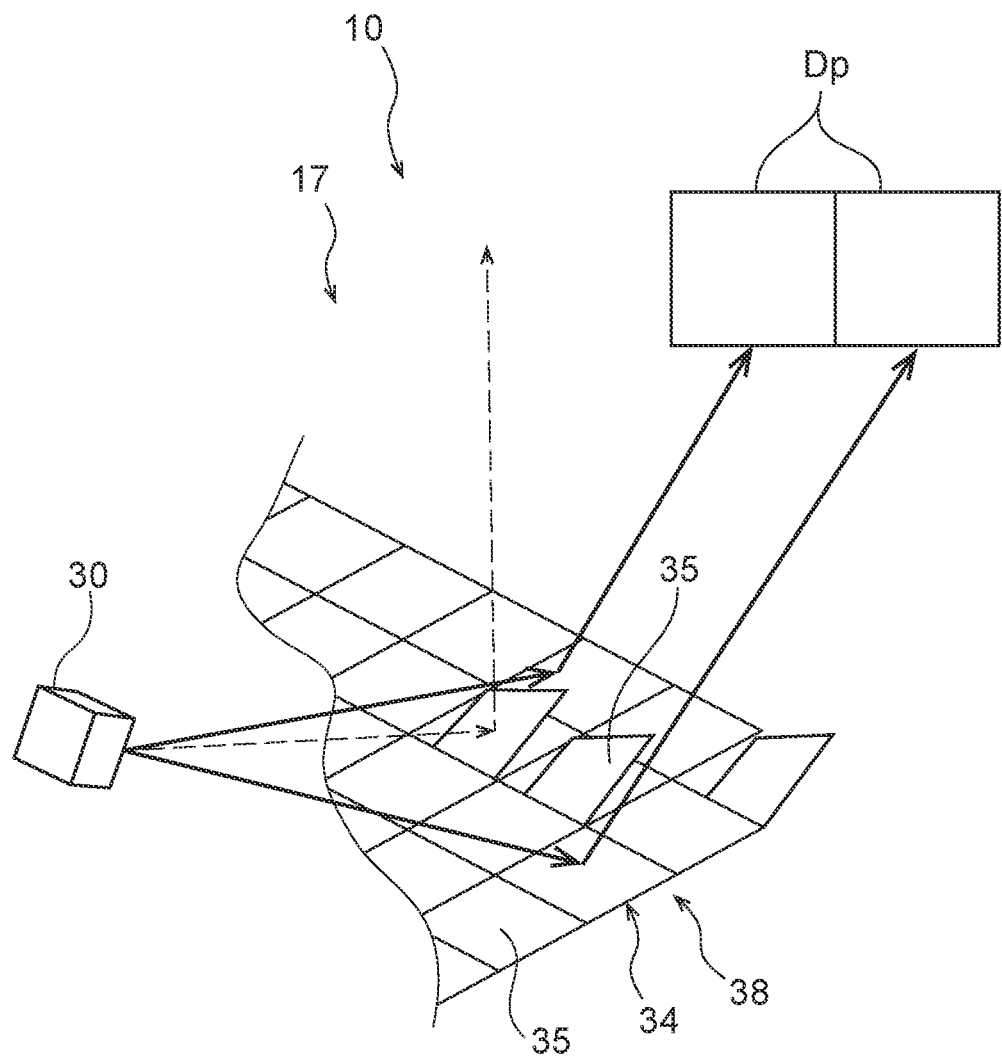
FIG. 4 is an explanatory drawing showing a second illuminating unit of the vehicle headlight device relating to the present embodiment.

As shown in FIG. 2 and FIG. 4, the drawing beam unit 17 has a visible light source 30, a condensing lens 32 (omitted from FIG. 4) that condenses the visible light that has exited from the visible light source 30, a DMD (Digital Mirror Device) 34 that serves as a second mirror and reflects the visible light condensed by the condensing lens 32, and a projection lens 36 that transmits therethrough the visible light reflected by the DMD 34 and illuminates it toward the vehicle front side. Note that a DMD unit 38 (see FIG. 5) is structured by the DMD 34 and a semiconductor substrate (not illustrated) that is described later.

The visible light source 30 is a light-emitting diode (LED), a halogen lamp or a discharge lamp, and is a high-intensity light source. The condensing lens 32 is a lens whose DMD 34 side protrudes-out in a hemispherical shape and whose visible light source 30 side is a flat surface. The projection lens 36 also is a lens whose vehicle front side protrudes-out in a hemispherical shape and whose vehicle rear side is a flat surface. The DMD 34 is structured by plural micro mirrors 35 (see FIG. 4) that are arrayed in a two-dimensional form (the form of a matrix). The respective micro mirrors 36 are formed on the semiconductor substrate (not illustrated) by a semiconductor process such that the angles thereof can be changed.

Further, as shown in FIG. 5, the DMD unit 38 is electrically connected to the control device 40, and is structured such that the respective micro mirrors 35 of the DMD 34 are driven (the angles of the respective micro mirrors 35 are changed) by control of the control device 40. Note that the visible light source 30 also is electrically connected to the control device 40, and the turning-on and turning-off of the visible light source 30 is carried out by control of the control device 40.

In the present embodiment, as shown in FIG. 4, the angles of the respective micro mirrors 35 that are in states of not being driven by control of the control device 40 (states in which the micro mirrors 35 are not energized and the angles thereof are not changed) are illuminating angles at which the micro mirrors 35 illuminate information displaying light (a drawn pattern) Dp that is visible light toward the drawing beam orientation area Da.

Namely, when the micro mirror 35 is at the illuminating angle, the visible light illuminated onto that micro mirror 35 is reflected toward the projection lens 36. Note that the visible light (the information displaying light) that is incident on the projection lens 36 is transmitted through the projection lens 36 and is illuminated toward the drawing beam orientation area Da.

Further, the angles of the some of the micro mirrors 35 that are driven (that are energized and whose angles are changed) by control of the control device 40 are blocking angles. Namely, when the micro mirror 35 is at the blocking angle, the visible light illuminated onto that micro mirror 35 is reflected in a direction in which it is not incident on the projection lens 36.

Figure 7A:
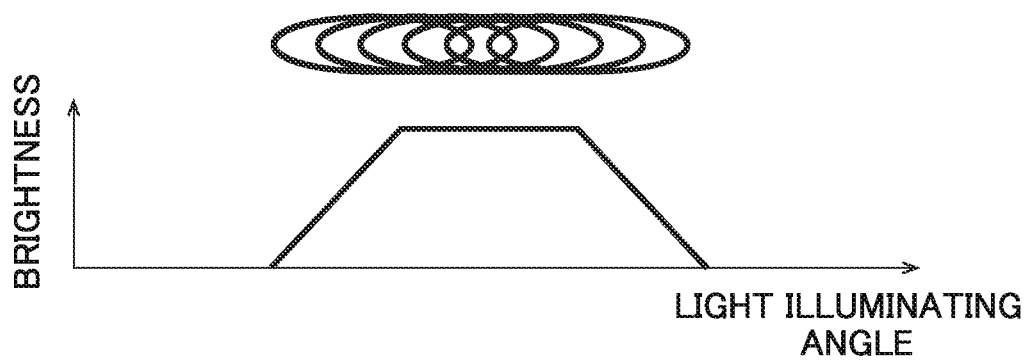
FIG. 7A is an explanatory drawing showing brightness of the first illuminating unit of the vehicle headlight device relating to the present embodiment.
Figure 7B:
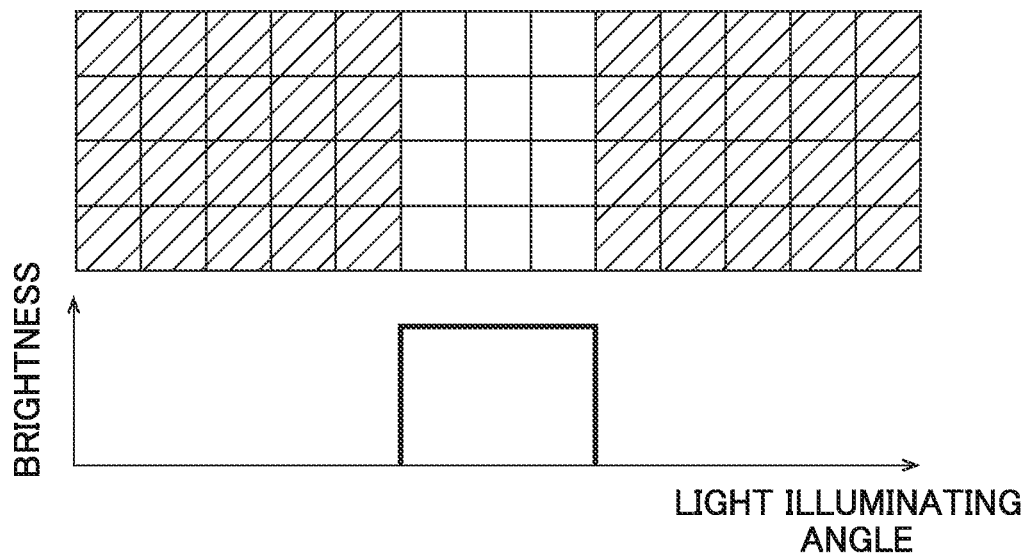
FIG. 7B is an explanatory drawing showing brightness of the second illuminating unit of the vehicle headlight device relating to the present embodiment.

Here, as shown in FIG. 7A, in the case of a laser scanning method, because the laser light is illuminated in an overlapping manner, the brightness of the both end portions of this scanning light becomes weaker (the contrast becomes lower) from the central portion toward these both end portions. However, as shown in FIG. 7B, in the case of a method of reflecting by a DMD 34, the regions where the visible light is illuminated and the regions where the visible light is not illuminated are clearly separate, and the contrast of the both end portions is high.

Therefore, the information displaying light (the drawn pattern) that is illuminated by the drawing beam unit 17 is illuminated more brightly than the visible light that is illuminated by the low-beam unit 16 and the scanning light that is illuminated by the high-beam unit 18, and information, such as a mark or a word or the like, is displayed clearly as shadow in the drawing beam orientation area Da.

Namely, when some of the micro mirrors 35 are set at the blocking angles due to control of the control device 40, a portion that is shadow is formed in the drawing beam orientation area Da. The information such as a mark or a word or the like is displayed by this shadow. Note that, rather than the information such as a mark or a word or the like being displayed by shadow, the entire region may be made to be shadow, and the information such as a mark or a word or the like may be displayed by light. Moreover, the visible light source 30 may be made to be a known, so-called RGB light source, and the visible light that is illuminated from the visible light source 30 may be made to be full-color, and the information such as a mark or a word or the like may be colored.

As shown in FIG. 6, the low-beam unit 16 has a visible light source (not illustrated), and the projection lens 46 that transmits therethrough the visible light that has exited from the visible light source and illuminates the visible light toward the vehicle front side. The visible light source is a light-emitting diode (LED), a halogen lamp or a discharge lamp, and is a high-intensity light source.

Further, as shown in FIG. 5, the low-beam unit 16 is, together with the laser scanning unit 28 of the high-beam unit 18 and the DMD unit 38 of the drawing beam unit 17, electrically connected to the control device 40. Due thereto, the turning-on and turning-off of the visible light source (not illustrated) at the low-beam unit 16 is carried out not only by the driver operating a switch, but also by control of the control device 40.

Further, as shown in FIG. 5, the control device 40 is electrically connected to a periphery sensing unit 50 such as an unillustrated camera or radar or the like that is provided at the vehicle 12. Accordingly, due to the control device 40 controlling the low-beam unit 16 on the basis of the information sensed by the periphery sensing unit 50, at times of traveling at night, visible light is automatically illuminated toward the low-beam orientation area La.

Further, due to the control device 40 controlling the laser scanning unit 28 (the high-beam unit 18) on the basis of the information sensed by the periphery sensing unit 50, scanning light is automatically illuminated toward the high-beam orientation area Ha except for the lighting exclusion area Sa. Moreover, due to the control device 40 controlling the DMD unit 38 (the drawing beam unit 17) on the basis of the information sensed by the periphery sensing unit 50, the information displaying light (the drawn pattern) is automatically illuminated toward the drawing beam orientation area Da.

Operation of the vehicle headlight device 10, which relates to the present embodiment and is structured as described above, is described next.

When the vehicle 12 is traveling at night, either the visible light source of the low-beam unit 16 is turned-on by the driver operating a switch, or the fact that it is nighttime is sensed by the periphery sensing unit 50, and, on the basis thereof, the control device 40 turns the visible light source of the low-beam unit 16 on. Due thereto, the visible light illuminated from the visible light source is transmitted through the projection lens 46, and is illuminated toward the low-beam orientation area La shown in FIG. 6.

Here, for example, as shown in FIG. 6, when a pedestrian P who is walking on the sidewalk W approaches the roadway that is not a pedestrian crossing, that information is sensed by the periphery sensing unit 50, and, on the basis of the results of this sensing, the control device 40 controls the laser scanning unit 28 of the high-beam unit 18. More concretely, the control device 40 controls the turning-on and turning-off of the laser light source 20, and controls the rotating operation of the biaxial scanning mirror 22.

Due thereto, the laser light that has exited from the laser light source 20 is made to be scanning light that is planar, and this scanning light is effectively illuminated toward the high-beam orientation area Ha except for the lighting exclusion area Sa which is for making it such that glare is not imparted to oncoming vehicles or preceding vehicles that are at the vehicle front side of the vehicle 12. Accordingly, it is easy for the driver of the vehicle 12 to become aware of the pedestrian P.

Note that the lighting exclusion area Sa is formed by the laser light source 20 being turned-off at the instant corresponding to that lighting exclusion area Sa. Therefore, a decrease in the efficiency of utilizing the laser light illuminated from the laser light source 20 can be suppressed or prevented, as compared with a structure in which the lighting exclusion area Sa is formed by changing the angles of the micro mirrors 35 of the DMD 34 in the same way as the drawing beam unit 17 for example.

Further, as shown in FIG. 6 for example, when a pedestrian P who is on the sidewalk W further approaches the roadway that is not a pedestrian crossing, that information is sensed by the periphery sensing unit 50, and, on the basis of the results of this sensing, the control device 40 controls the DMD unit 38 of the drawing beam unit 17. Namely, when the drawn pattern is to be formed by shadow for example, the DMD unit 38 is energized, and the angles of some of the micro mirrors 35 at the DMD 34 are changed, and a region where visible light is not illuminated toward the vehicle front side is created by these some micro mirrors 35.

Due thereto, the information displaying light (the drawn pattern), at which a decrease in contrast is suppressed or prevented, can be illuminated toward the drawn beam orientation area Da, and a caution alert can be efficiently given to the pedestrian P who has further approached the roadway that is not a pedestrian crossing (the pedestrian P who is starting to traverse the roadway that is not a pedestrian crossing). In particular, when this information displaying light is displayed in full color, the caution alert can be given even more efficiently to the pedestrian P, as compared with a structure in which the information displaying light is displayed monochromatically.

Further, when there is a structure in which the laser light that is illuminated from the laser light source 20 is reflected at the biaxial scanning mirror 22, it can be made such that less is taken-up by the high-beam unit 18 as compared with a structure in which, for example, the laser light is reflected by a uniaxial scanning mirror that rotates with the vertical direction being the axial direction thereof and a uniaxial scanning mirror that rotates with the horizontal direction being the axial direction thereof.

Further, as described above, when there is a structure in which the illuminating toward the high-beam orientation area Ha and the illuminating toward the drawing beam orientation area Da are carried out automatically by control of the control device 40, the burden on the driver (a vehicle occupant) can be reduced as compared with a structure in which the illuminating toward the high-beam orientation area Ha and the illuminating toward the drawing beam orientation area Da are carried out by the driver operating a switch (i.e., manually).

Further, when a relatively high-output visible light source is provided at a conventional high-beam unit for times of driving on an expressway for example (in order to increase the visibility of distant regions), and the vehicle travels on a general road, illumination is carried out with the output of the visible light source being lowered. Structuring the high-beam unit in accordance with a specification that has a low frequency of use in this way is disadvantageous in terms of cost.

However, in the present embodiment, because the high-beam unit 18 is structured to include the laser scanning unit 28, a high-output visible light source is not needed, which is advantageous in terms of costs. More concretely, in the case of a laser scanning method, it is possible to change the scanning range (the illumination range) of the laser light. If the scanning range of the laser light is made narrow, the laser light can be collected (the brightness thereof can be increased) by an amount corresponding to the amount by which the scanning range is made narrow.

Figure 8A:
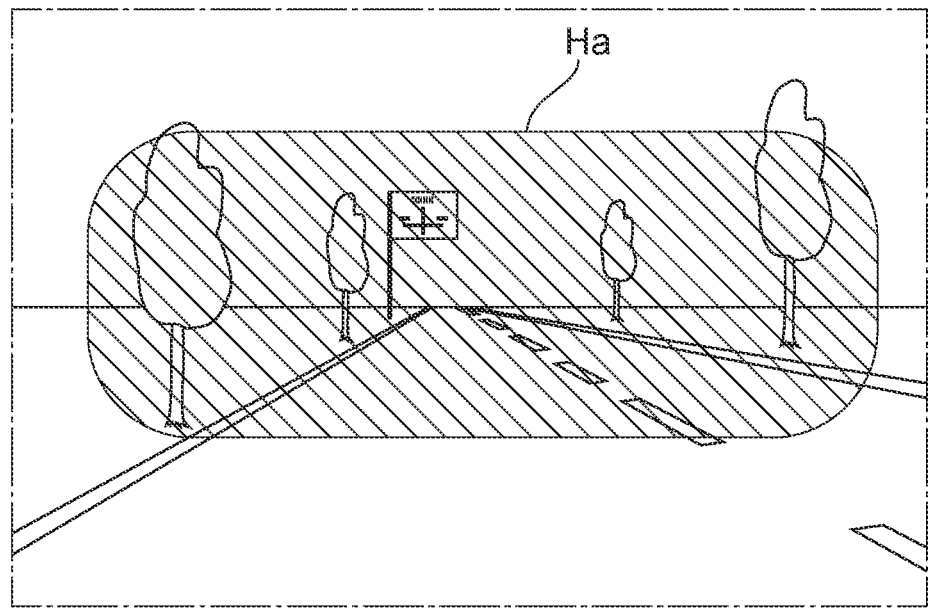
FIG. 8A is an explanatory drawing showing the first illumination region that is illuminated by the first illuminating unit of the vehicle headlight device relating to the present embodiment at a time of traveling on a general road.
Figure 8B:
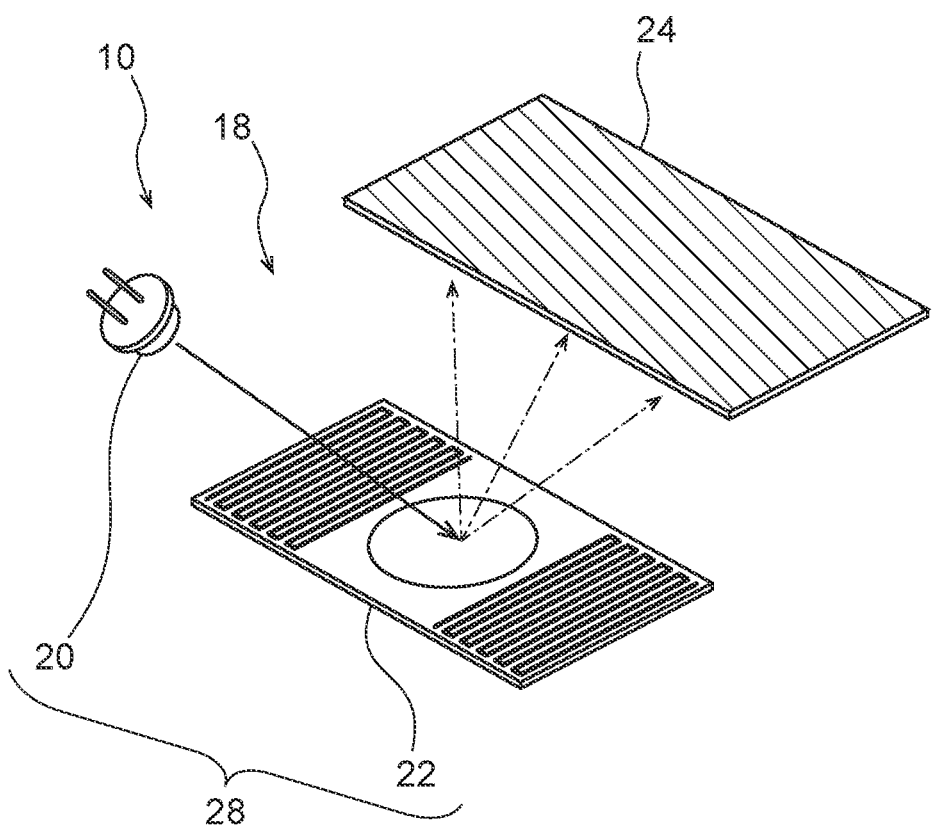
FIG. 8B is an explanatory drawing showing a range of usage of fluorescent light at the first illuminating unit of the vehicle headlight device relating to the present embodiment at a time of traveling on a general road
Figure 9A:
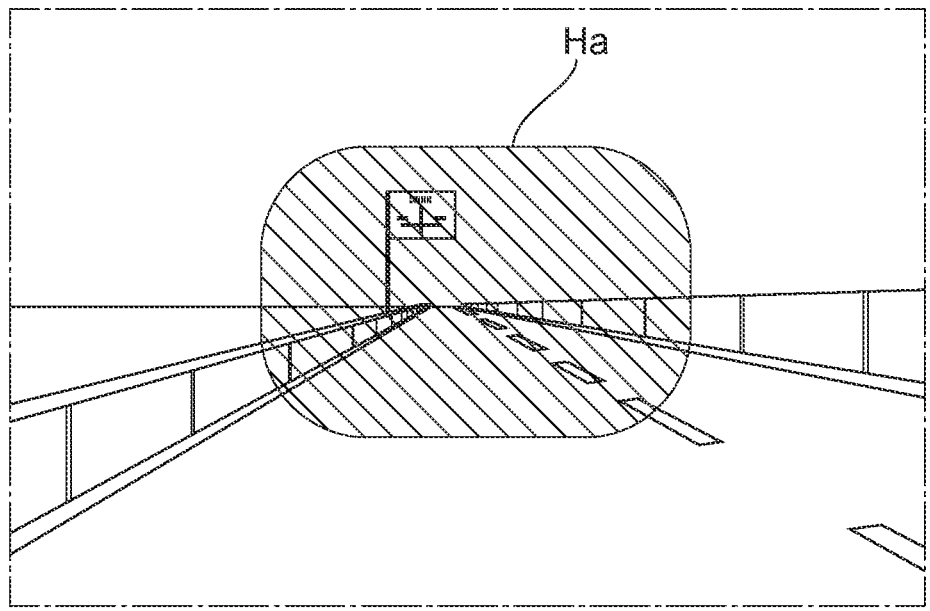
FIG. 9A is an explanatory drawing showing the first illumination region that is illuminated by the first illuminating unit of the vehicle headlight device relating to the present embodiment at a time of traveling on an expressway.
Figure 9B:
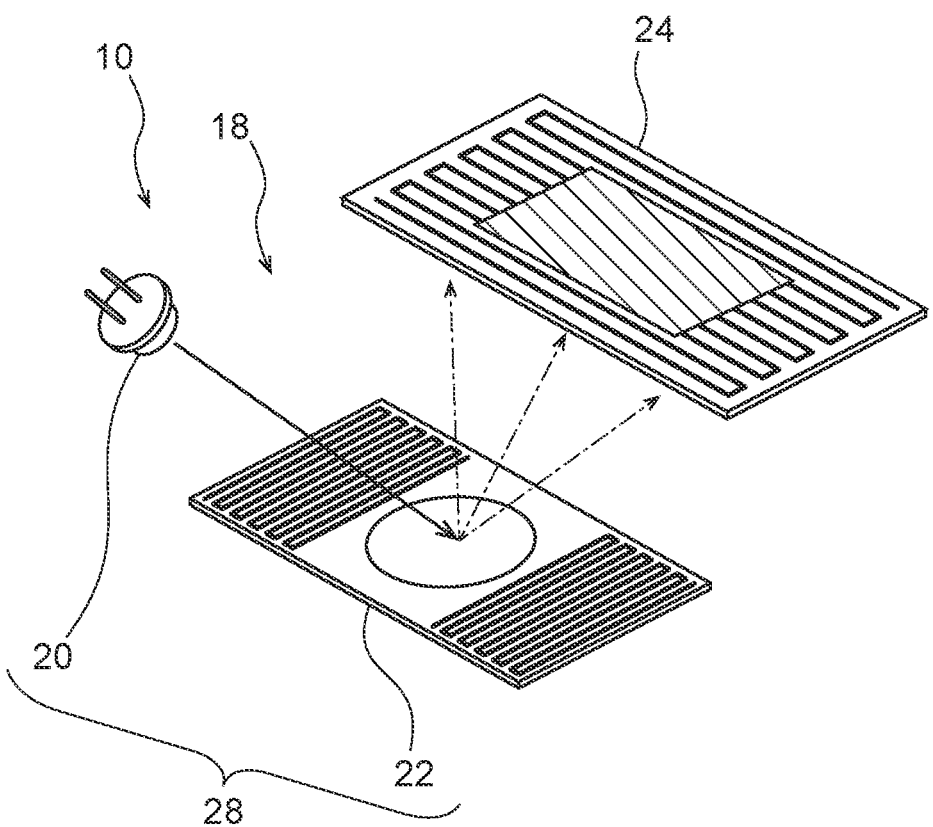
FIG. 9B is an explanatory drawing showing a range of usage of fluorescent light at the first illuminating unit of the vehicle headlight device relating to the present embodiment at a time of traveling on an expressway.

Accordingly, when the vehicle 12 travels on a general road as shown in FIG. 8A, substantially the entire surface of the fluorescent body 24 is used as shown in FIG. 8B. However, when the vehicle 12 travels on an expressway as shown in FIG. 9A, by using a portion of the fluorescent body, i.e., only a predetermined range that includes the central portion, as shown in FIG. 9B, the laser light can be collected, and the visibility of distant regions can be improved.

Figure 10A:
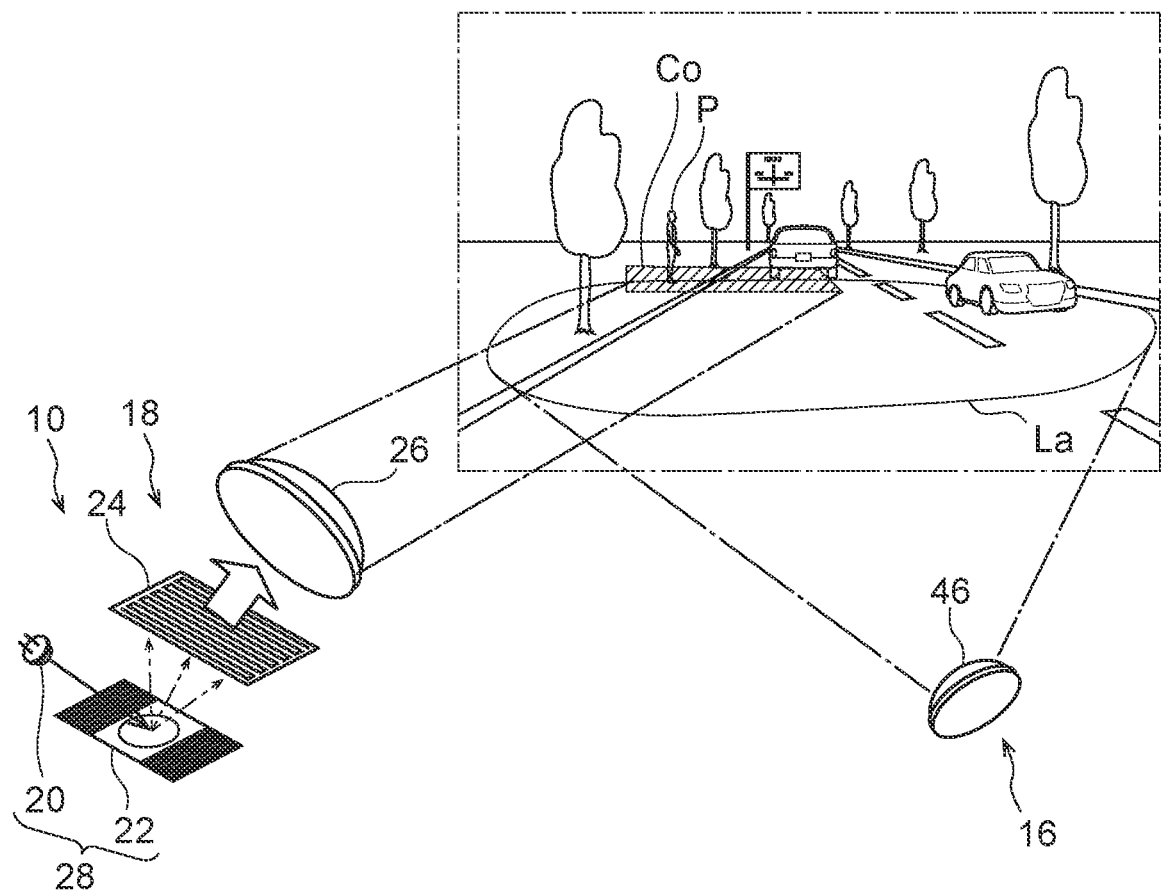
FIG. 10A is an explanatory drawing showing a state in which a portion of the third illumination region, which is to be illuminated by the third illuminating unit of the vehicle headlight device relating to the present embodiment, is illuminated by the first illuminating unit.
Figure 10B:
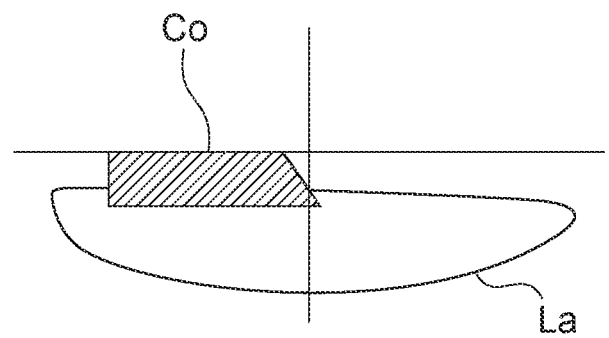
FIG. 10B is an explanatory drawing schematically showing the third illumination region that includes a portion illuminated by the first illuminating unit of FIG. 10A.
Figure 14A:
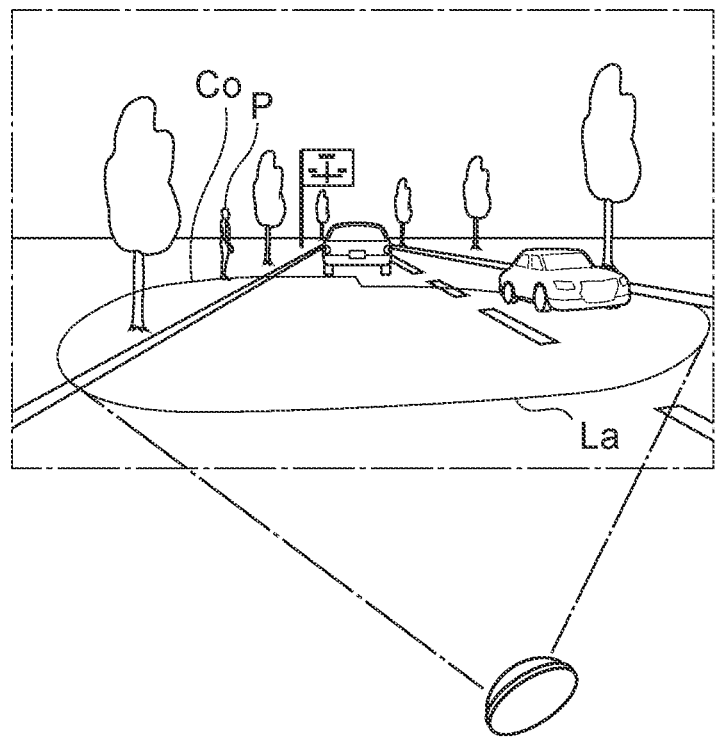
FIG. 14A is an explanatory drawing showing a third illumination region that is illuminated by a third illuminating unit of a vehicle headlight device relating to a comparative example.
Figure 14B:
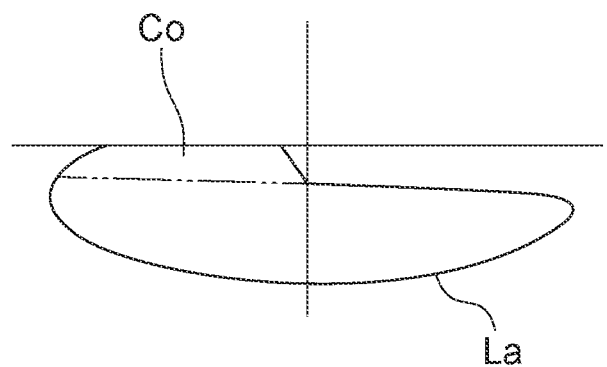
FIG. 14B is an explanatory drawing schematically showing the third illumination region of FIG. 14A.

Further, at a conventional low-beam unit, as shown in FIG. 14A and FIG. 14B for example, a cut-off portion Co is included in the low-beam orientation area La, and therefore, the shape of the shade (not illustrated) is complicated. However, in the present embodiment, as shown in FIG. 10A and FIG. 10B, because the cut-off portion Co can be formed in the low-beam orientation area La (the illumination range can be set appropriately) by the laser scanning unit 28 (the high-beam unit 18), the shape of the shade at the low-beam unit 16 can be simplified.

Figure 11:
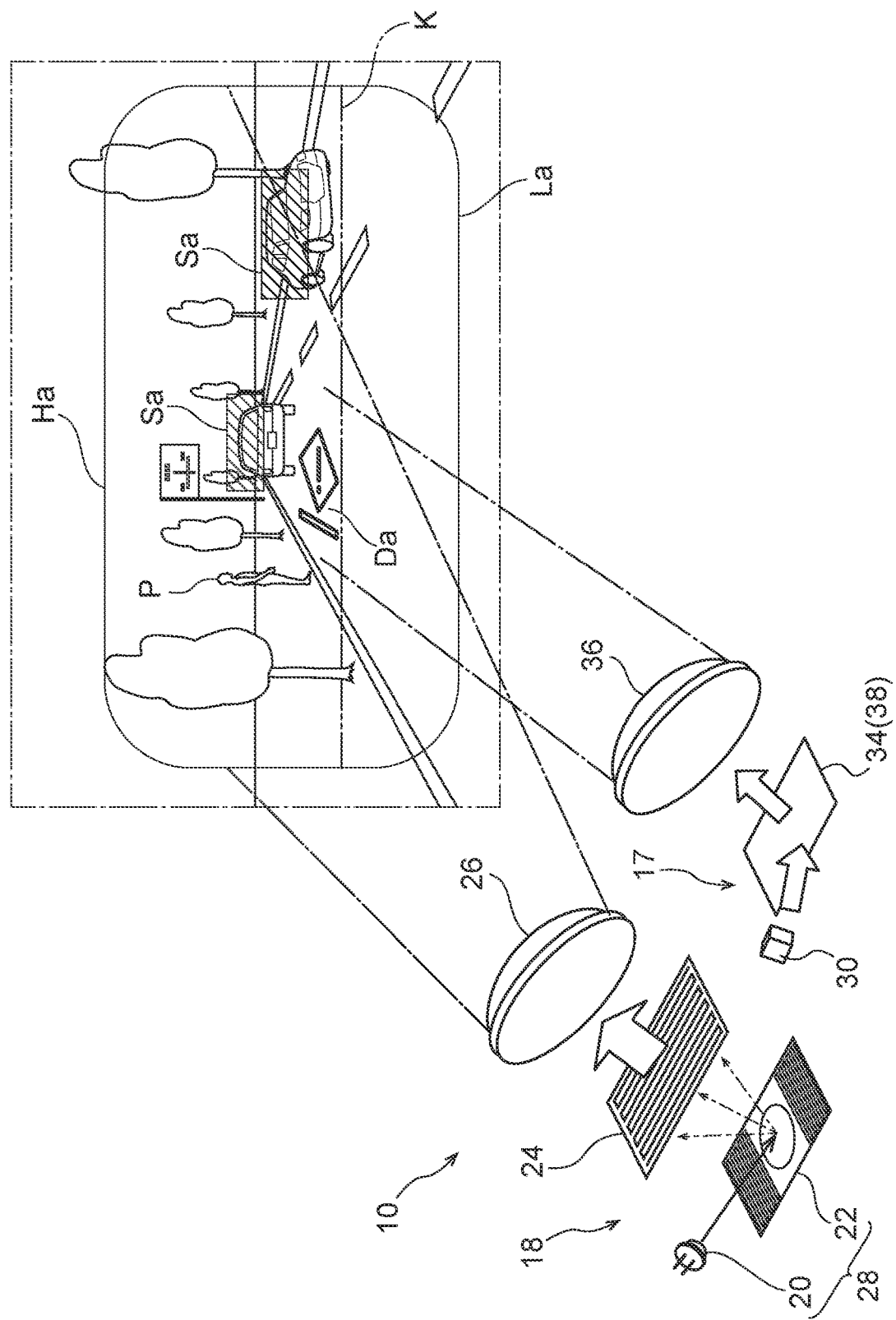
FIG. 11 is an explanatory drawing showing a state in which the third illuminating unit of the vehicle headlight device relating to the present embodiment is omitted, and the first illumination region and third illumination region are illuminated by the first illuminating unit.

Further, in accordance with the present embodiment, as shown in FIG. 11, the low-beam unit 16 can be eliminated. Namely, because the high-beam unit 18 is structured to include the laser scanning unit 28 whose illumination range can be set appropriately, the high-beam unit 18 can illuminate scanning light not only at the high-beam orientation area Ha, but also at the low-beam orientation area La (the area that is closer to the vehicle 12 than imaginary line K). Namely, in accordance with the high-beam unit 18 that includes the laser scanning unit 28, scanning light toward can be illuminated onto only the low-beam orientation area La, and scanning light can be illuminated onto both the low-beam orientation area La and the high-beam orientation area Ha.

Figure 12:
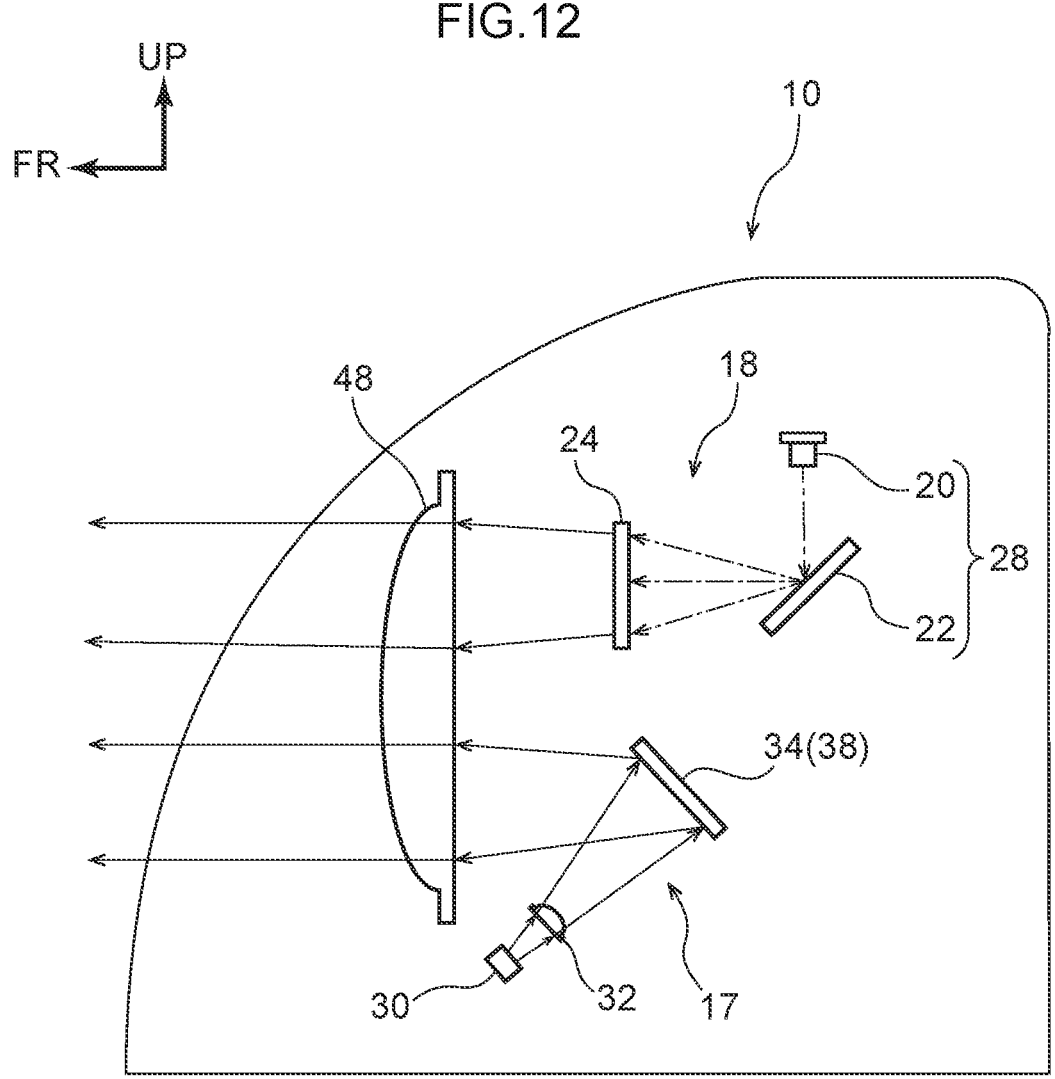
FIG. 12 is a side view corresponding to FIG. 2 and showing the structure of a first modified example of the vehicle headlight device relating to the present embodiment.

Further, the high-beam unit 18 and the drawing beam unit 17 are not limited to the structures shown in FIG. 2. For example, as shown in FIG. 12, the projection lens 26 at the high-beam unit 18 and the projection lens 36 at the drawing beam unit 17 may be made into a common projection lens. Namely, a single, large projection lens 48 may be provided instead of the projection lens 26 and the projection lens 36. In accordance therewith, the number of parts can be reduced.

Figure 13:
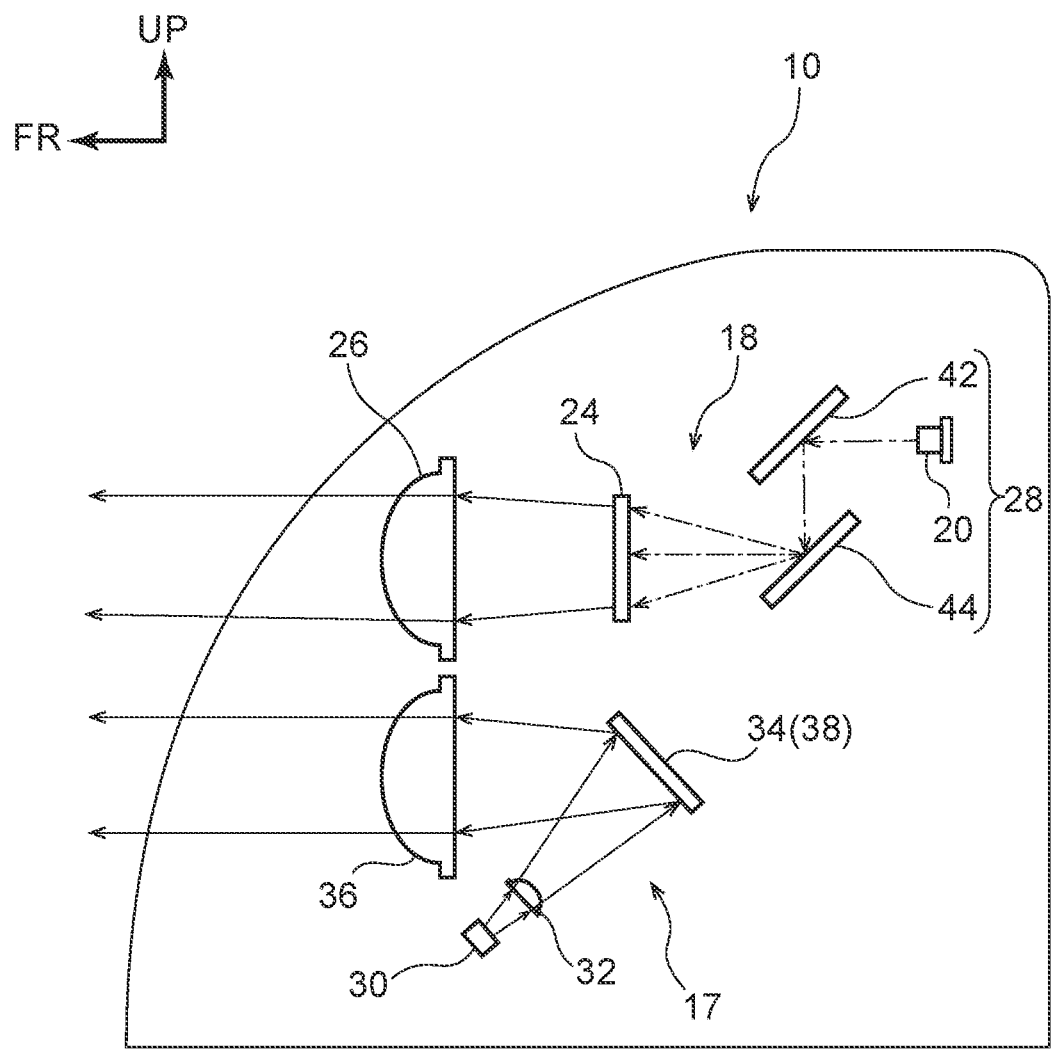
FIG. 13 is a side view corresponding to FIG. 2 and showing the structure of a second modified example of the vehicle headlight device relating to the present embodiment.

Further, as shown in FIG. 13 for example, the high-beam unit 18 may be structured to, instead of the biaxial scanning mirror 22, include a first uniaxial scanning mirror 42 that serves as a first mirror and that rotates with the axial direction thereof being the vertical direction that serves as a first direction, and a second uniaxial scanning mirror 44 that serves as a first mirror and that rotates with the axial direction thereof being the horizontal direction that serves as a second direction. By using this first uniaxial scanning mirror 42 and second uniaxial scanning mirror 44, the structure of the high-beam unit 18 can be simplified as compared with a case of using the biaxial scanning mirror 22.

Note that, in this case, the laser scanning unit 28 is structured by the laser light source 20, the first uniaxial scanning mirror 42 and the second uniaxial scanning mirror 44. Further, in the illustrated structure, the first uniaxial scanning mirror 42 is disposed at the upper side (the upstream side in the advancing direction of the laser light), and the second uniaxial scanning mirror 44 is disposed at the lower side (the downstream side in the advancing direction of the laser light). However, the arrangement is not limited to this. Namely, although not illustrated, the second uniaxial scanning mirror 44 may be disposed at the upper side, and the first uniaxial scanning mirror 42 may be disposed at the lower side.

Although the vehicle headlight device 10 relating to the present embodiment has been described above on the basis of the drawings, the vehicle headlight device 10 relating to the present embodiment is not limited to the illustrated structure, and the design thereof can be changed appropriately within a scope that does not depart from the gist of the present disclosure. For example, the placement of the high-beam unit 18 and the drawing beam unit 17 is not limited to the arrangement shown in FIG. 1.

Further, the biaxial scanning mirror 22 is not limited to a structure that is rotated with the axial directions thereof being the vertical direction and the horizontal direction, and it suffices for the biaxial scanning mirror to be a structure that is rotated with the axial directions thereof being directions that are orthogonal to one another. Similarly, the first uniaxial scanning mirror 42 and the second uniaxial scanning mirror 44 also are not limited to structures that are rotated with the axial directions thereof being the vertical direction and the horizontal direction respectively, and it suffices for these uniaxial scanning mirrors to be structures that are rotated with the respective axial directions thereof being directions that are orthogonal to one another.

Moreover, the timing of the illuminating of the scanning light toward the high-beam orientation area Ha and the timing of the illuminating of the information displaying light toward the drawing beam orientation area Da are not limited to those in the above-described embodiment, and these lights can be illuminated appropriately in accordance with various situations that occur during nighttime driving of the vehicle 12. Further, the mark or word or the like that is displayed by the information displaying light (the drawn pattern) also can be changed approximately in accordance with various types of situations.

What is claimed is:

1. A vehicle headlight device comprising:
    a first illuminating unit that includes a first mirror that rotatingly operates, the first mirror reflecting laser light that has exited from a laser light source, making the laser light into scanning light, and illuminating the scanning light toward a first illumination region that is in front of a vehicle;
    a second illuminating unit that includes a second mirror that is an aggregate of a plurality of micro mirrors having angles that can be changed, the second mirror reflecting visible light that has exited from a visible light source, and illuminating the reflected light toward a second illumination region that is in front of the vehicle;
    a controlling unit that controls turning-off and turning-on of the laser light source, rotating operation of the first mirror, and changing of the angles of the micro mirrors at the second mirror; and
    a third illuminating unit configured to illuminate visible light, which has exited from a visible light source, toward a third illumination region that is closer to the vehicle than the first illumination region,
    wherein the first illuminating unit is configured to illuminate a portion of the third illumination region, which is to be illuminated by the third illuminating unit, so that the scanning light from the first illuminating unit forms a cut-off portion of the third illuminating region.

2. The vehicle headlight device of claim 1, wherein the first mirror is structured by a biaxial scanning mirror that rotates with respective axial directions that are orthogonal to one another.

3. The vehicle headlight device of claim 2, wherein the controlling unit effects control on the basis of information obtained by a periphery sensing unit for sensing a periphery of the vehicle.

4. The vehicle headlight device of claim 2, wherein the first illuminating unit and the second illuminating unit have a common projection lens that transmits therethrough the scanning light and illuminates the scanning light toward the first illumination region, and that transmits therethrough the reflected light and illuminates the reflected light toward the second illumination region.

5. The vehicle headlight device of claim 2, wherein the second illuminating unit illuminates the reflected light in which at least a mark appears.

6. The vehicle headlight device of claim 2, wherein the second illuminating unit illuminates colored light.

7. The vehicle headlight device of claim 1, wherein the first mirror is structured by a first uniaxial scanning mirror that rotates with a first axial direction, and a second uniaxial scanning mirror that rotates with a second axial direction that is orthogonal to the first axial direction.

8. The vehicle headlight device of claim 7, wherein the controlling unit effects control on the basis of information obtained by a periphery sensing unit for sensing a periphery of the vehicle.

9. The vehicle headlight device of claim 7, wherein the first illuminating unit and the second illuminating unit have a common projection lens that transmits therethrough the scanning light and illuminates the scanning light toward the first illumination region, and that transmits therethrough the reflected light and illuminates the reflected light toward the second illumination region.

10. The vehicle headlight device of claim 7, wherein the second illuminating unit illuminates the reflected light in which at least a mark appears.

11. The vehicle headlight device of claim 7, wherein the second illuminating unit illuminates colored light.

12. The vehicle headlight device of claim 1, wherein the controlling unit effects control on the basis of information obtained by a periphery sensing unit for sensing a periphery of the vehicle.

13. The vehicle headlight device of claim 1, wherein the first illuminating unit and the second illuminating unit have a common projection lens that transmits therethrough the scanning light and illuminates the scanning light toward the first illumination region, and that transmits therethrough the reflected light and illuminates the reflected light toward the second illumination region.

14. The vehicle headlight device of claim 1, wherein the second illuminating unit illuminates the reflected light in which at least a mark appears.

15. The vehicle headlight device of claim 1, wherein the second illuminating unit illuminates colored light.

* * * * *